(12) United States Patent
James et al.

(10) Patent No.: US 9,083,169 B2
(45) Date of Patent: Jul. 14, 2015

(54) SELF-INDEXING NUT PLATE

(71) Applicant: The Boeing Company, Chicago, IL (US)

(72) Inventors: Lowell Scott James, Marysville, WA (US); Jeffry Glen Bickford, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 72 days.

(21) Appl. No.: 13/621,257

(22) Filed: Sep. 16, 2012

(65) Prior Publication Data

US 2013/0189050 A1    Jul. 25, 2013

Related U.S. Application Data

(63) Continuation-in-part of application No. 13/357,275, filed on Jan. 24, 2012, now Pat. No. 8,911,191.

(51) Int. Cl.
*F16B 37/04* (2006.01)
*H02G 3/32* (2006.01)

(52) U.S. Cl.
CPC .............. *H02G 3/32* (2013.01); *F16B 37/043* (2013.01); *F16B 37/045* (2013.01)

(58) Field of Classification Search
USPC .............. 411/172, 174, 84, 85, 965, 970; 248/220.31–220.43, 221.11, 222.12, 248/222.13
See application file for complete search history.

(56) References Cited

U.S. PATENT DOCUMENTS

| | | | |
|---|---|---|---|
| 2,168,721 A * | 8/1939 | Tinnerman | 24/290 |
| 2,250,072 A * | 7/1941 | Tinnerman | 411/549 |
| 2,286,696 A * | 6/1942 | Tinnerman | 248/50 |
| 2,387,951 A * | 10/1945 | Slater et al. | 248/68.1 |
| 4,303,217 A * | 12/1981 | Garfinkle | 248/220.42 |
| 4,619,428 A * | 10/1986 | Bailey | 248/220.43 |
| 4,819,324 A | 4/1989 | Roberts | |
| 5,020,952 A | 6/1991 | Zeigler et al. | |
| 6,209,827 B1 | 4/2001 | Kawai | |
| 6,880,787 B2 * | 4/2005 | Stephen et al. | 248/68.1 |
| 7,101,135 B2 | 9/2006 | Hassed | |
| 8,002,507 B2 * | 8/2011 | James | 411/85 |
| 2009/0072098 A1 * | 3/2009 | Smallhorn | 248/68.1 |

FOREIGN PATENT DOCUMENTS

EP    1122477 A2    8/2001

OTHER PUBLICATIONS

International Preliminary Report on Patentability issued Jul. 29, 2014 for PCT/US2012/070880, 5 pages.

* cited by examiner

*Primary Examiner* — Flemming Saether
(74) *Attorney, Agent, or Firm* — Smith Moore Leatherwood LLP; Thomas W. Epting

(57) ABSTRACT

An aircraft comprises a secondary support structure, and a nut plate engaging the secondary support structure. The nut plate includes at least one locator protrusion engaging a mounting hole in the secondary support structure to constrain motion of the nut plate along the secondary support structure. The nut plate further includes means for additionally constraining motion of the nut plate away from the secondary support structure.

9 Claims, 13 Drawing Sheets

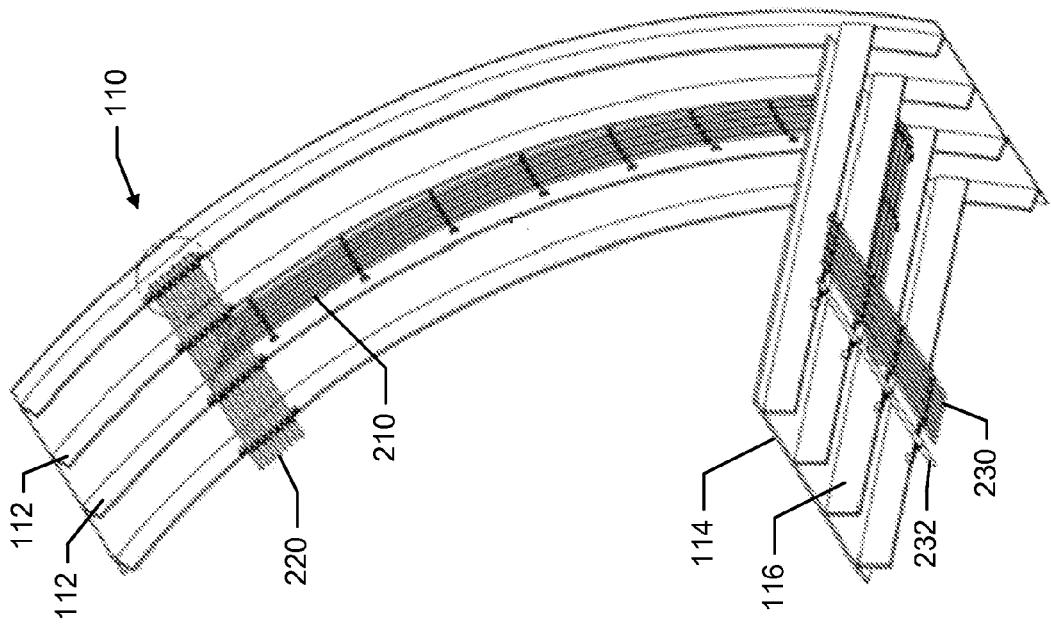
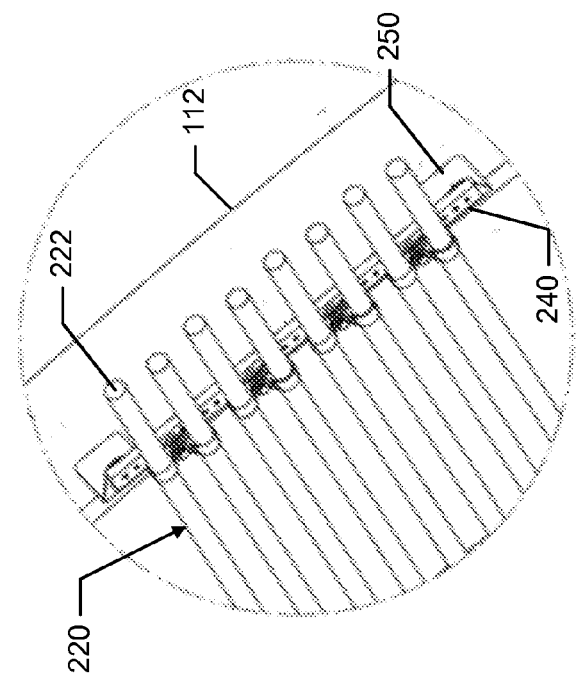

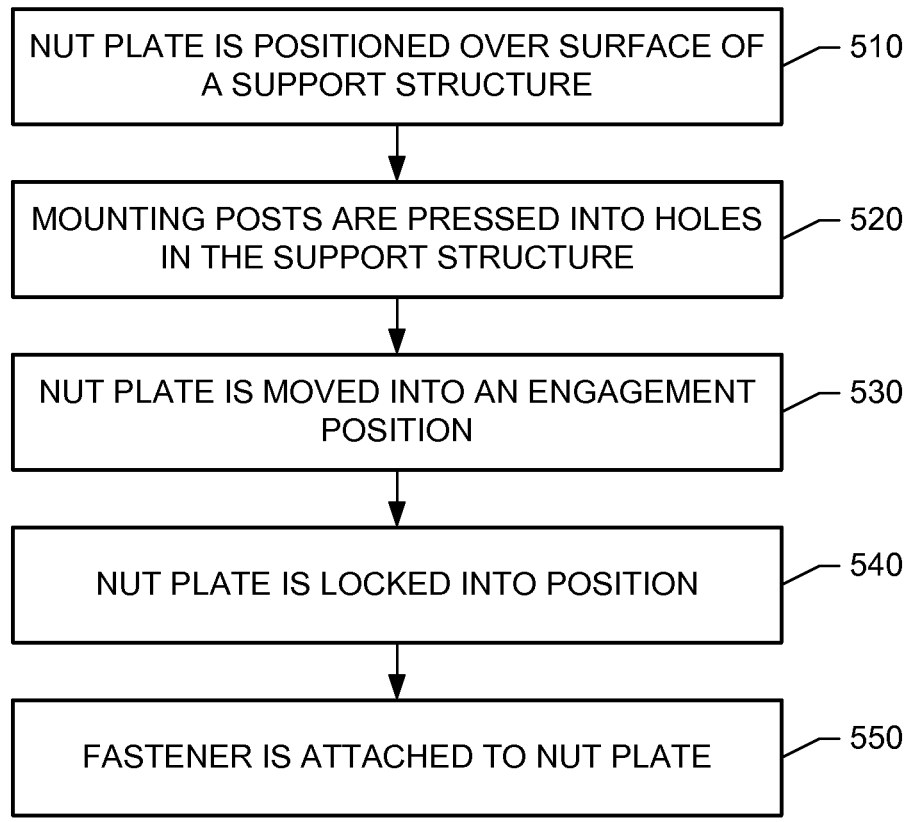

FIG. 6A
FIG. 6B
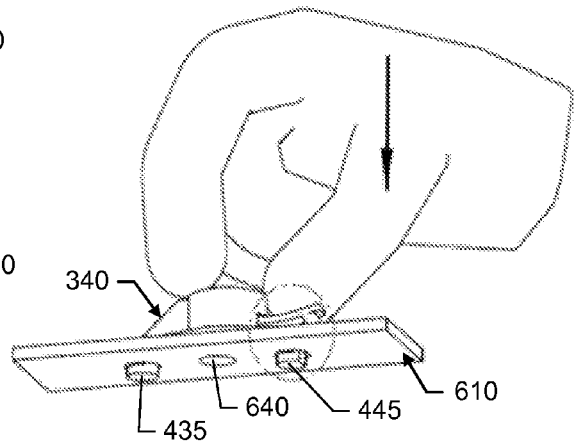
FIG. 6D
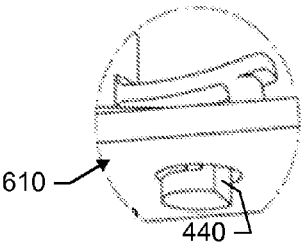
FIG. 6C
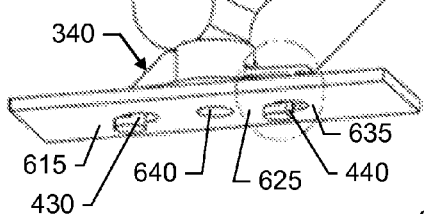
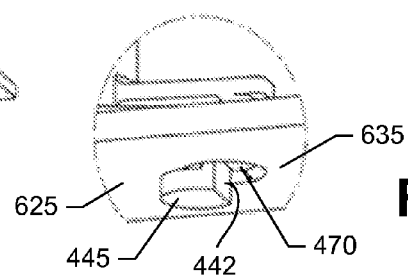
FIG. 6E

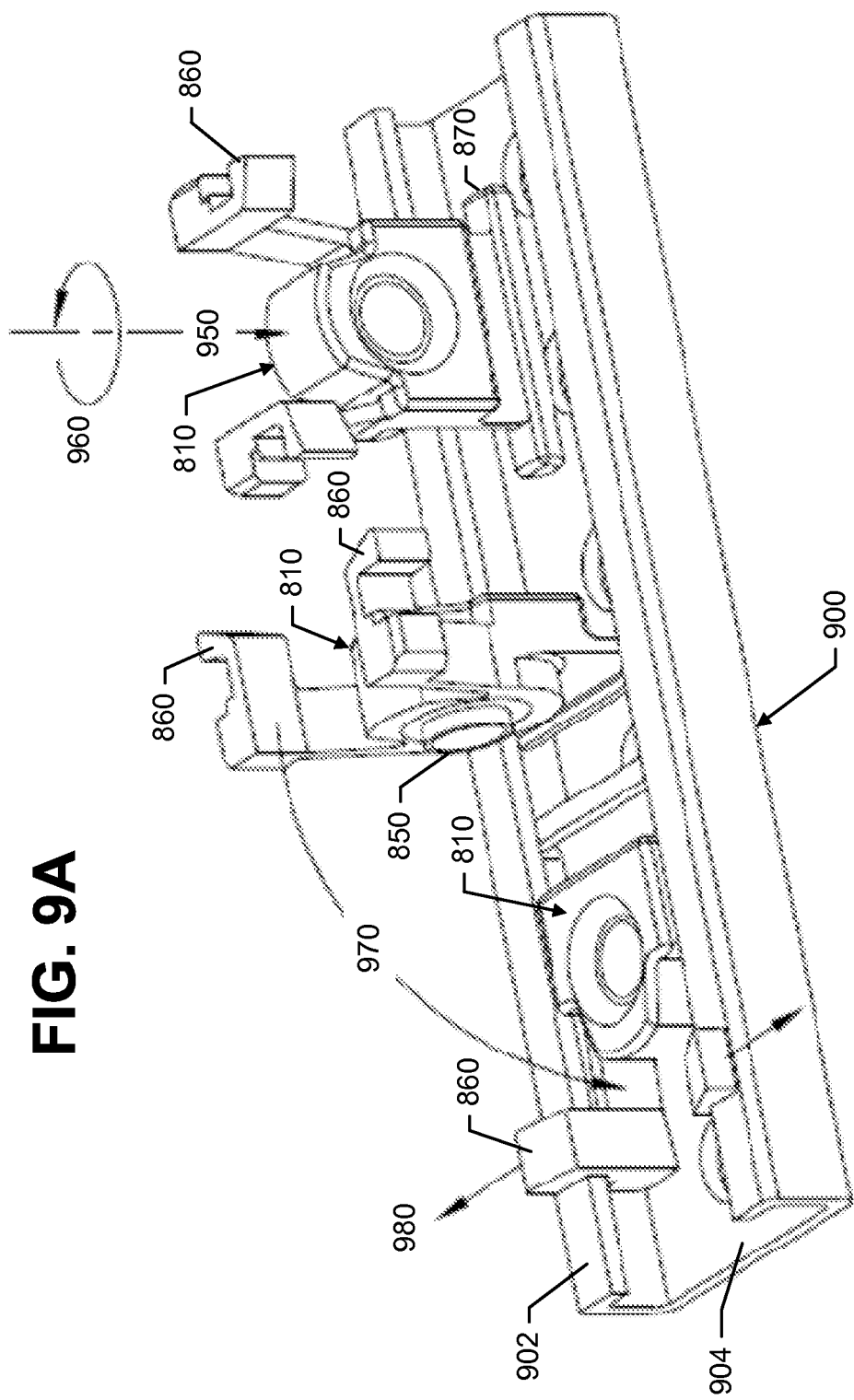

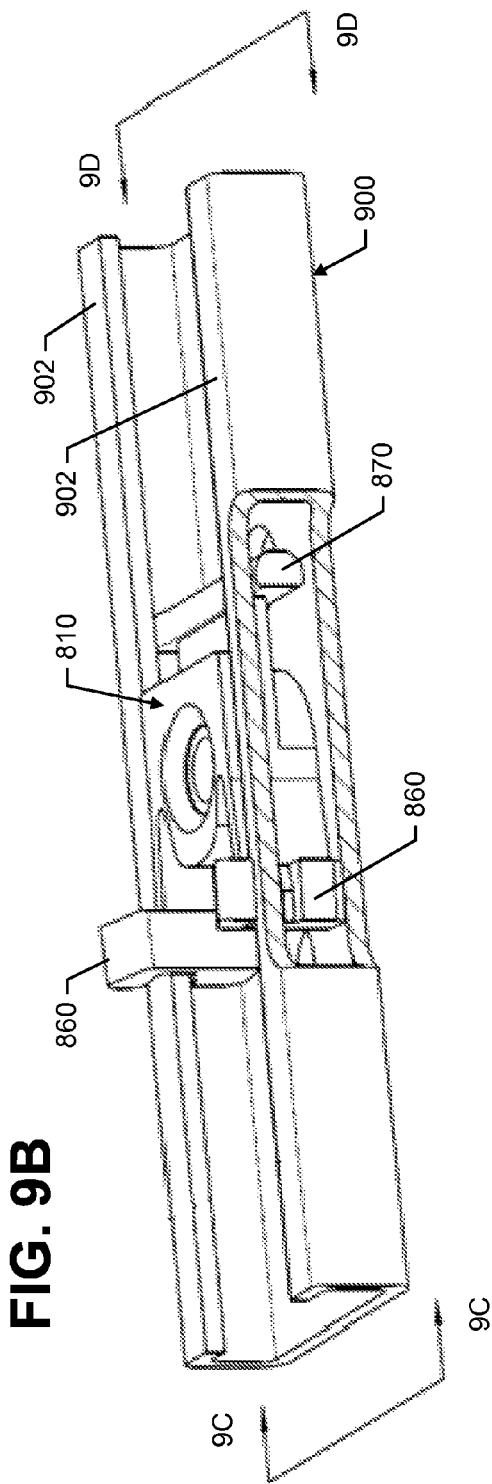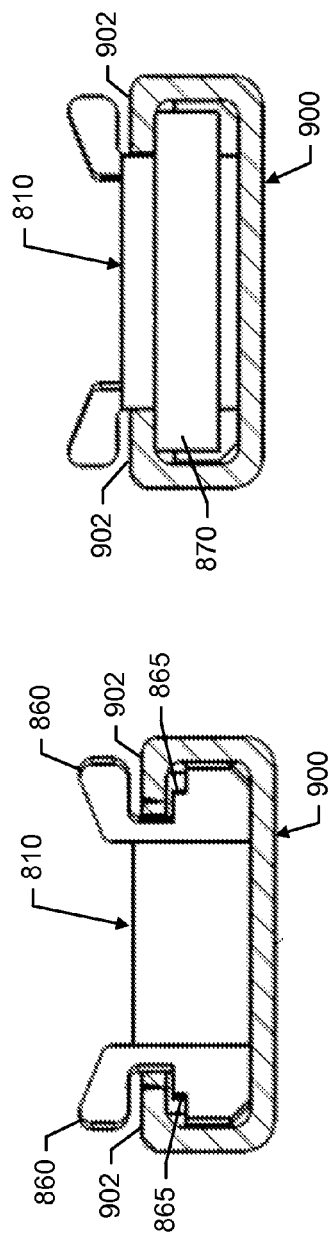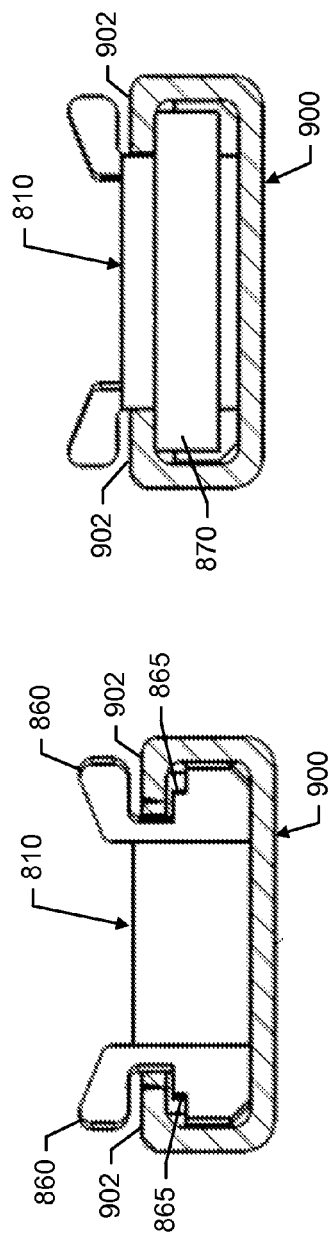

FIG. 12A
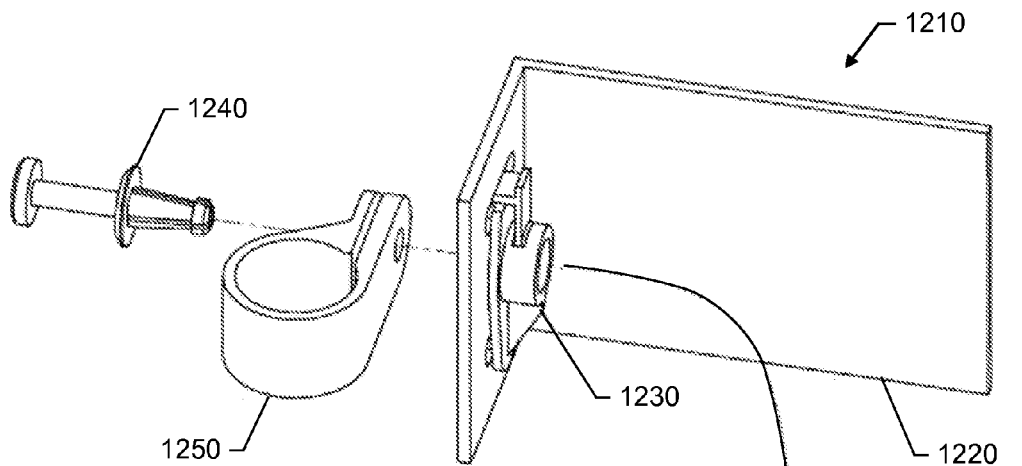
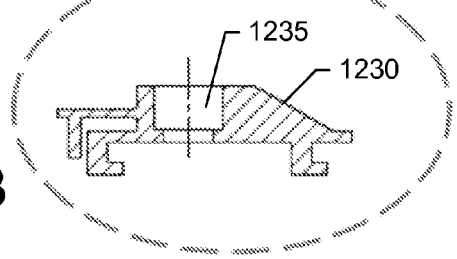
FIG. 12B
FIG. 13
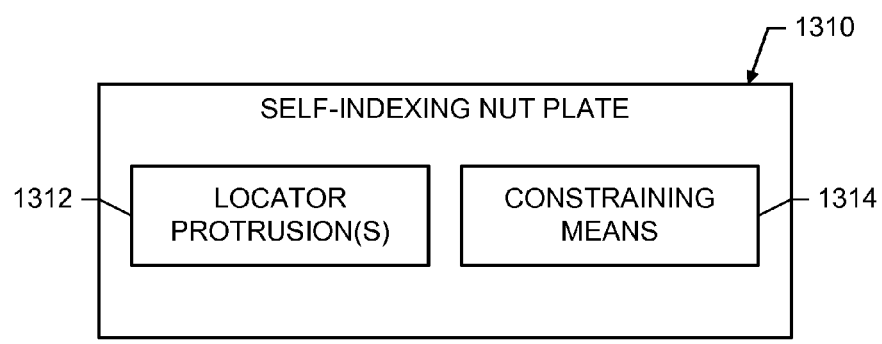

SELF-INDEXING NUT PLATE

This is a continuation-in-part of copending U.S. Ser. No. 13/357,275 filed 24 Jan. 2012.

BACKGROUND

Spanner bars and other secondary support structures are commonly used in commercial aircraft for wire bundle management. A typical spanner bar includes a thin gauge member having a repeating pattern of mounting holes separated by lands.

The spanner bars may be secured to primary aircraft structures. Wire support hardware such as p-clamps and ring posts are fastened to the spanner bars, and wire bundles are secured to the wire support hardware.

A ring post may be fastened to a spanner bar as follows. The ring post is positioned on a front side of the spanner bar. A threaded end of the ring post is aligned with a select open hole of the spanner bar. The threaded end of the ring post is maneuvered through the select hole until threads are exposed on a back side of the spanner bar. A loose washer and nut are placed over and threaded onto the threaded end of the ring post. The nut is tightened with a hand tool until firmly clamped against the spanner bar. This process is repeated for each ring post.

It would be desirable to reduce part count and installation time of attaching wire support hardware to a spanner bar. Even a seemingly trivial reduction for a single nut and washer can be significant due to the large number of fastening operations on secondary support structures in a commercial aircraft.

SUMMARY

According to an embodiment herein, an aircraft comprises a secondary support structure, and a nut plate engaging the secondary support structure. The nut plate includes at least one locator protrusion engaging a mounting hole in the secondary support structure to constrain motion of the nut plate along the secondary support structure. The nut plate further includes means for additionally constraining motion of the nut plate away from the secondary support structure.

According to another embodiment herein, an apparatus comprises a spanner bar having a surface with an alternating pattern of mounting holes and lands, and a nut plate engaging the spanner bar. The nut plate includes a body having a mounting surface and an internally threaded bore accessible from the mounting surface, the mounting surface in contact with the spanner bar; at least one protrusion extending from the mounting surface, each protrusion engaging one of the mounting holes to constrain motion of the nut plate along the spanner bar; and means for engaging the spanner bar to constrain motion of the nut plate away from the spanner bar without cooperation of mounting hardware.

According to another embodiment herein, a nut plate is configured to engage a thin gauge member whose base has a pattern of equidistant holes and lands. The nut plate includes a body having a mounting surface and an internally threaded bore accessible from the mounting surface; a locator protrusion configured to extend from the mounting surface and into one of the mounting holes; and first and second resilient finger tabs cantilevered to the body and extending outward from the body. The tabs are configured to releasably engage the member's return flanges to constrain motion of the nut plate away from the base.

These features and functions may be achieved independently in various embodiments or may be combined in other embodiments. Further details of the embodiments can be seen with reference to the following description and drawings.

BRIEF DESCRIPTION OF THE DRAWINGS

FIGS. 2A and 2B are illustrations of raceway wire bundles in a fuselage of an aircraft.

FIG. 5 is an illustration of a method of installing and using the first embodiment of the self-indexing nut plate.

FIGS. 6A-6E are illustrations of the first embodiment of the self-indexing nut plate during various stages of installation.

FIG. 9A is an illustration of a method of installing the second embodiment of the self-indexing nut plate on a spanner bar having return flanges.

FIGS. 9B-9D are illustrations of the second embodiment of the self indexing nut plate engaged with the spanner bar having return flanges.

FIGS. 12A and 12B are illustrations of an assembly including a bracket, a self-indexing nut plate, and a push-in fastener.

FIG. 13 is an illustration of a generic self-indexing nut plate.

DETAILED DESCRIPTION

Figure 1:
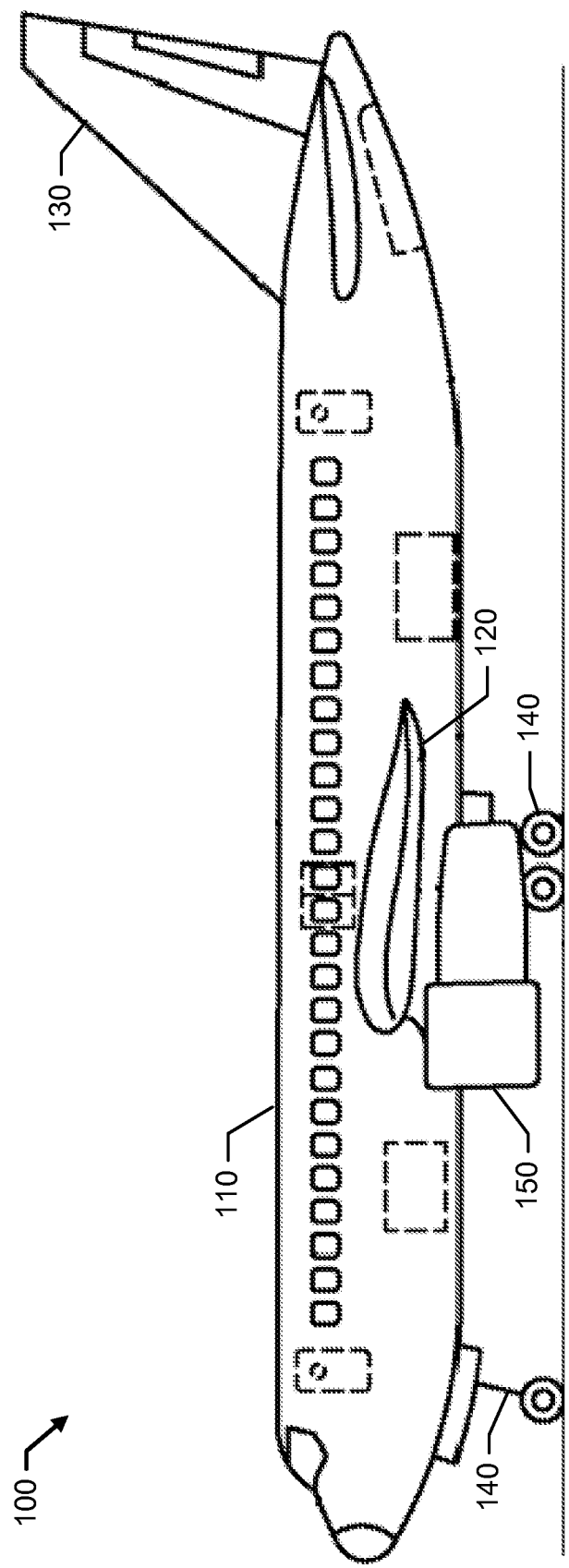
FIG. 1 is an illustration of an aircraft.

Reference is made to FIG. 1, which illustrates an aircraft 100 including a fuselage 110, wing assemblies 120, empennage 130, and landing gear assemblies 140. Propulsion engines 150 are mounted to the wing assemblies 120.

The aircraft 100 further includes wiring assemblies and tubing assemblies. The wiring assemblies include wire bundles that are attached to secondary support structures such as spanner bars. The tubing assemblies include tubing that is attached to secondary support structures such as combination tube and spanner bars. These secondary support structures may be located inside the fuselage 110 and wing assemblies 120.

Reference is now made to FIG. 2A, which illustrates some raceway wire bundles 210, 220 and 230 inside the aircraft fuselage 110. A frame bay raceway wire bundle 210 is located between frames 112 of the fuselage 110. A crown raceway wire bundle 220 extends across frames 112 of the fuselage 110. A floor raceway wire bundle 230 is located beneath a floor 114 of the fuselage 110, and extends across several floor beams 116. The floor raceway wire bundle 230 supports a small tube 232.

Additional reference is made to FIG. 2B, which shows a portion of the crown raceway wire bundle 220 in greater detail. Wires 222 in the bundle 220 are clamped to a spanner bar 240. The spanner bar 240, in turn, is secured to a frame 112 by a bracket 250.

The spanner bar 240 may be a thin gauge member having a repeating pattern of mounting holes separated by lands. For instance, the spanner bar 240 may have an equally spaced, predrilled open-hole pattern of mounting holes separated by lands.

Reference is made to FIG. 13, which illustrates a generic self-indexing nut plate 1310 for fastening wire support hardware to a secondary support structure such as the spanner bar 240. Each nut plate 1310 includes at least one locator protrusion 1312. Each protrusion 1312 engages one of the mounting holes in the secondary support structure to constrain motion of the nut plate 1310 along the secondary support structure. The nut plate 1310 further includes means 1314 for additionally constraining motion of the nut plate 1310 away from the secondary support structure.

Figure 3:
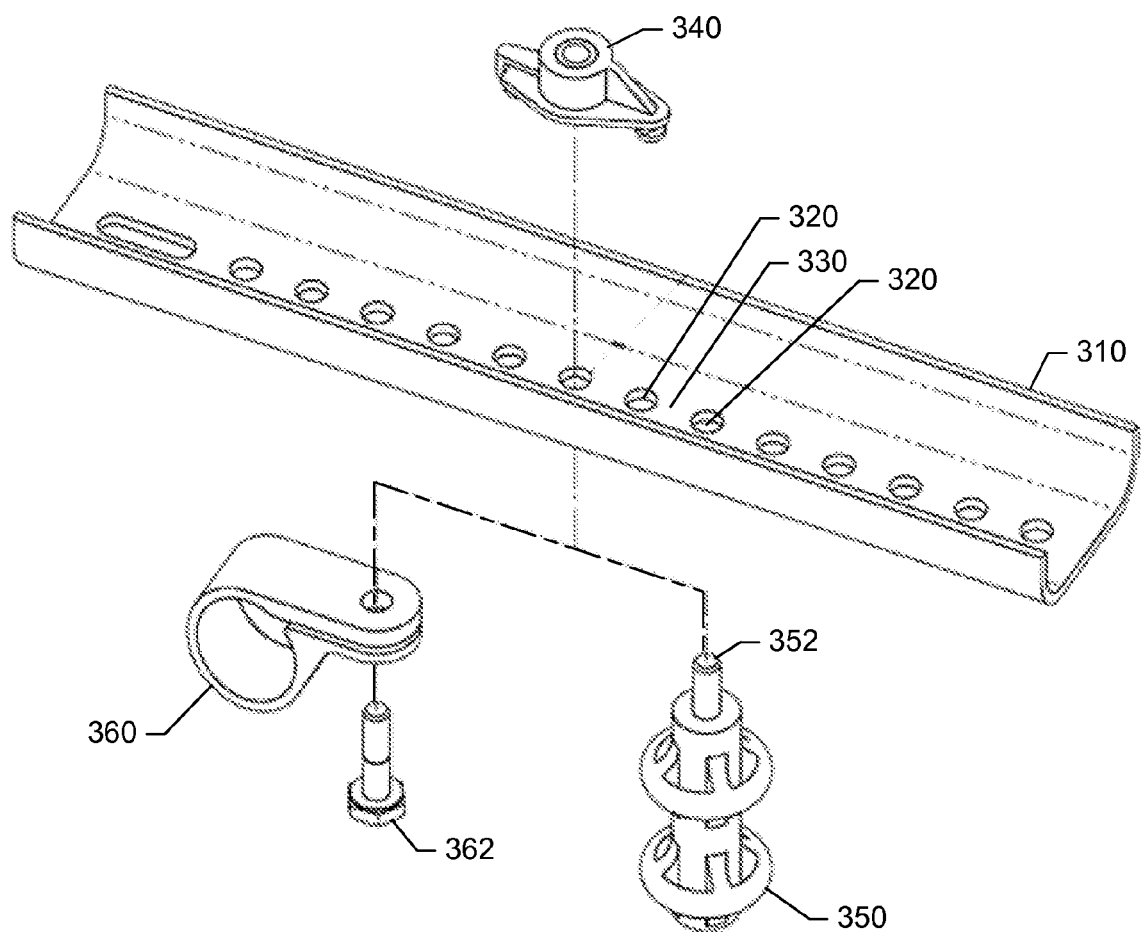
FIG. 3 is an illustration of a spanner bar and a first embodiment of a self-indexing nut plate.

FIG. 3 illustrates a first embodiment of a self-indexing nut plate 340. The nut plate 340 is engaged with a spanner bar 310 and locked in place, whereby an internally threaded bore in the nut plate 340 is aligned with a mounting hole 320 in the spanner bar 310. The nut plate 340 is engaged with the spanner bar 310 prior to installing fastener hardware such as a ring post 350 or p-clamp 360 (which holds a wire bundle or tubing). Thereafter, a threaded stud 352 of the ring post 350 or a p-clamp bolt 362 may be inserted through the mounting hole 320 of the spanner bar 310 and threaded into the bore of the nut plate 340. A wire bundle (not shown) may be attached to the ring post 350 after the ring post 350 has been threaded into the nut plate 340. A wire bundle or tubing (not shown) may be held by the p-clamp 360 as the p-clamp bolt 362 is being threaded into the nut plate 340.

Figure 4A:
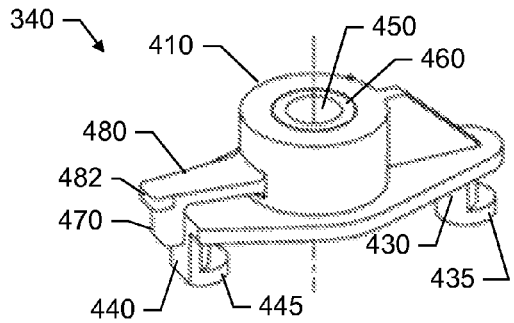
FIGS. 4A to 4D are illustrations of the first embodiment of the self-indexing nut plate.
Figure 4B:
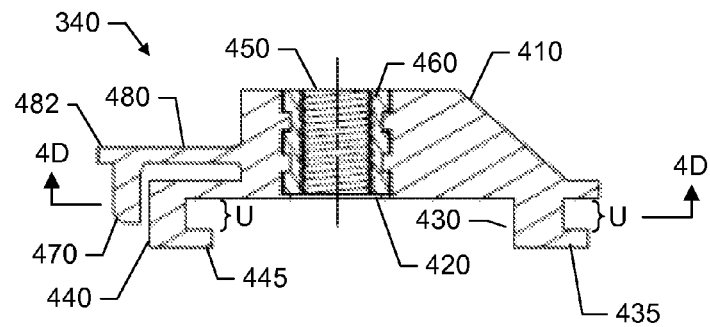

Reference is made to FIGS. 4A and 4B, which illustrate the first embodiment of the self-indexing nut plate 340 in greater detail. The nut plate 340 includes a body 410 having a flat mounting surface 420 and an internal bore 450 that extends to the mounting surface 420. The bore 450 may have an internally threaded portion 460 for engaging fastener hardware (e.g., the ring post 350). In some embodiments, the threaded portion 460 may be a full thread metallic insert.

The nut plate 340 further includes first and second mounting posts (locator protrusions) 430 and 440 extending from the mounting surface 420. The mounting posts 430 and 440 may be orthogonal to the mounting surface 420. Each mounting post 430 and 440 has an undercut portion U. In some embodiments, both posts 430 and 440 terminate in circular caps 435 and 445 (restraining means), which have larger cross-sections than the posts 430 and 440. In those embodiments, each undercut portion U is defined by a cap 435 or 445, post 430 or 440, and mounting surface 420.

The posts 430 and 440 are located on opposite sides of the bore 450. The bore 450 is offset from the posts 430 and 440 (that is, the bore 450 is closer to one of the posts 440 than the other post 430) by an offset distance. The offset distance is such that the bore 450 is aligned with a hole 320 in the spanner bar 310 when the undercut portions U of the posts 430 and 440 engage the lands of the spanner bar 310 (that is, when the nut plate 340 engages the spanner bar 310).

The nut plate 340 further includes a locking member 470 that is hinged from the body 410 by a spring lever 480. The lever 480 can move the locking member 470 between a locked position and an unlocked position. The locking member 470 may be retracted by pulling up on a release grip ledge 482 of the spring lever 480. This retraction feature is desirable because it allows a mislocated nut plate 340 to be relocated, and it allows a nut plate 340 to be released from the spanner bar 310 and reused.

In some embodiments, the body 410, the posts 430 and 440, the caps 435 and 445, the locking member 470 and the spring lever 480 are made of plastic. The body 410 may include a boss molded around the full thread metallic insert.

Figure 4C:
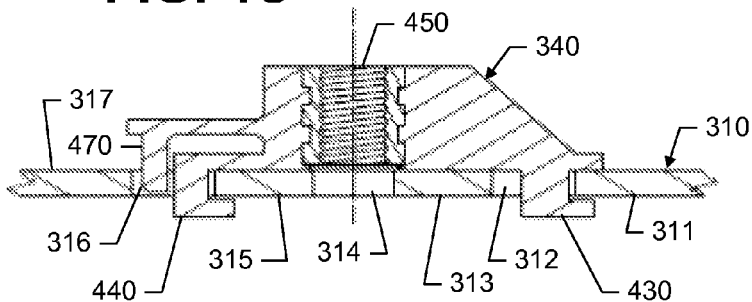

Reference is now made to FIG. 4C, which illustrates the nut plate 340 locked to the spanner bar 310. FIG. 4C shows the following features of the spanner bar 310: a first land 311, first hole 312, second land 313, second hole 314, third land 315, third hole 316, and fourth land 317.

The nut plate 340 engages the spanner bar 310 when the posts 430 and 440 are abutted against the first and third lands 311 and 315 of the spanner bar 310. The nut plate 340 is locked to the spanner bar 310 by inserting the locking member 470 into the third hole 316 to occupy the space between the post 440 and the fourth land 317. With the nut plate 340 locked as such, the bore 450 of the nut plate 340 is aligned with the second hole 314 in the spanner bar 310.

Figure 4D:
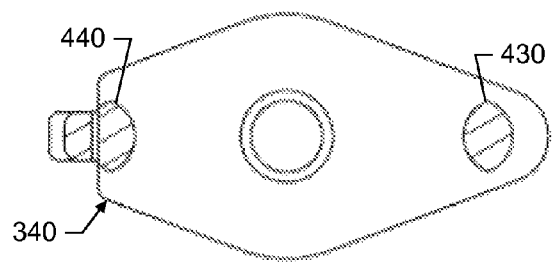

Reference is now made to FIG. 4D, which is a cross-sectional view of FIG. 4B along lines 4D-4D. In some embodiments, the posts 430 and 440 may have an elliptical shape in cross section. Moreover, the posts 430 and 440 are preferably solid. This geometry allows the posts 430 and 440 to withstand shear forces that are generated when a fastener (e.g., a ring post stud 352) is torqued onto the nut plate 340.

The posts 430 and 440 are superior to conventional pin barbs. The posts 430 and 440 have greater cross-sectional area than conventional pin barbs and are better suited to handle greater torque loads (which can occur when a fastener is threaded into the nut plate 340). The posts 430 and 440 also have greater ledge surface area and can counter larger axial loads. Therefore, the posts 430 and 440 are less likely to disengage and release the nut plate 340 from the spanner bar 310. Pin barbs, in contrast, tend to collapse inward and disengage.

Reference is now made to FIG. 5 and FIGS. 6A-6E, which illustrate a method of installing a nut plate 340 onto a secondary support structure 610. Three holes of the support structure 610 will be used by the nut plate 340.

Referring to block 510 of FIG. 5 and also to FIG. 6A, the nut plate 340 is held in one hand and positioned above the surface of the support structure 610. The posts 430 and 440 of the nut plate 340 are aligned with first and second holes 620 and 630 of the support structure 610.

Referring to block 520 of FIG. 5 and also to FIG. 6B, the first and second mounting posts 430 and 440 are firmly pressed (in the direction of the arrow) through the first and second holes 620 and 630 until the mounting surface of the nut plate 340 makes contact with the support structure 610. At this point, the center axis of the internal bore 450 is not in alignment with a center (third) hole 640. In addition, the spring lever 480 is flexed upward. The undercut portions of the mounting posts 430 and 440 have not yet engaged the support structure 610 (see also FIG. 6C).

Referring to block 530 of FIG. 5 and also to FIG. 6D, the nut plate 340 is slid forward in the direction of the arrow until each mounting post 430 and 440 abuts against a land 615 and 625. At this point, the bore 450 in the nut plate 340 is aligned with the center hole 640. Thus, the nut plate 340 is self-indexing.

The undercut portions in the mounting posts 430 and 440 may be slightly wider or narrower than the gauge of the support structure 610. In some embodiments, the gap may be slightly narrower, whereby the cap 445 is deflected outward by the land 625 and snap onto the land 625 as the nut plate 340 is being pushed into engagement (FIG. 6E).

At block 540 of FIG. 5, the nut plate 340 is locked in position. The spring lever 480 is depressed to push the locking member 470 into the space between the second mounting post 430 and the trailing land 635. An audible sound such as a "click" may occur as the locking member 470 is snapped onto the hole 630. The audible sound provides additional input to the installer that the nut plate 340 has properly engaged the support member 610.

A trailing surface 442 of the second mounting post 440 may be flattened to mate with the locking member 470 (FIG. 6E). The locking member 470 prevents the nut plate 340 from moving along the support structure 610. The caps 435 and 445 prevent the engaged nut plate 340 from being pulled away from the support structure 610.

At block 550 of FIG. 5, a fastener is installed into the nut plate 340. This may be done immediately after the nut plate is installed, or some time later.

The nut plate 340 is not limited to spanner bars and similar secondary support structures. For example, the nut plate 340 may be used to mount a sidewall gap cover to sidewall panels via a secondary support structure such as a bracket.

Figure 7A:
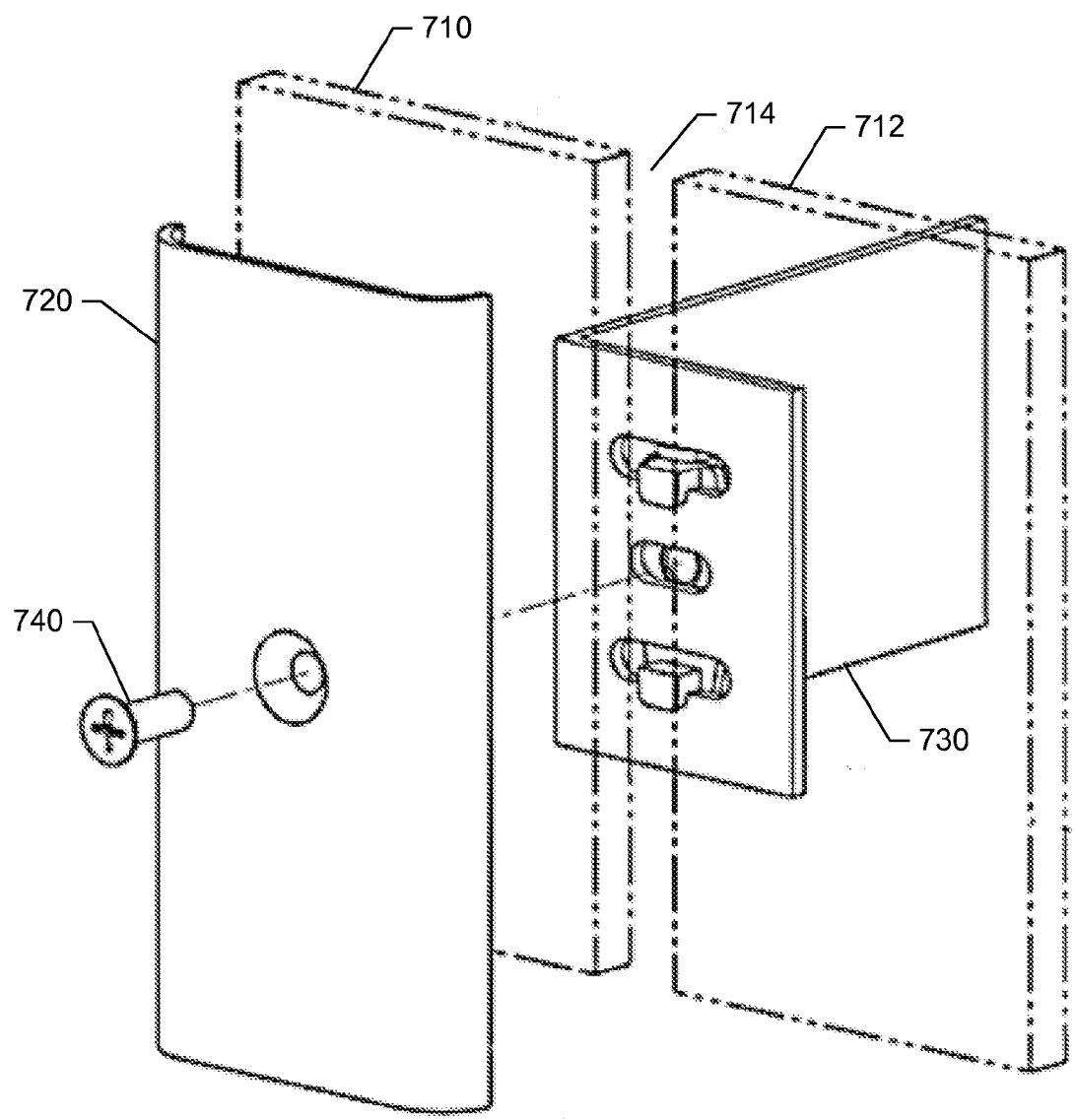
FIG. 7A is an illustration of an assembly including two sidewalls, a sidewall gap cover, a self-indexing nut plate, and a bracket having a slotted hole pattern for mounting the sidewall gap cover.

Reference is now made to FIG. 7A, which illustrates two adjacent sidewall panels 710 and 712 and a gap 714 there between. FIG. 7A also illustrates a cover 720 for covering the gap 714, cover mounting fastener 740, and related bracket 730.

Figure 7B:
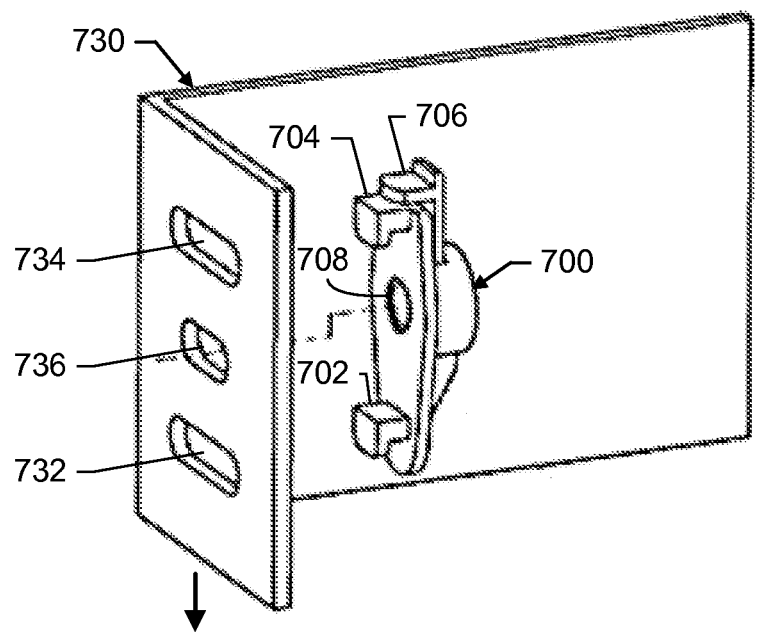
FIG. 7B is an illustration of the self-indexing nut plate and the bracket of FIG. 7A.
Figure 7C:
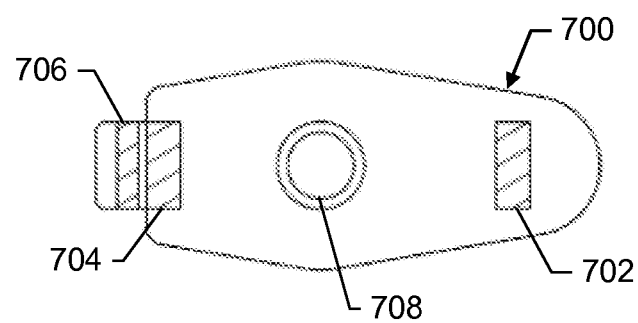
FIG. 7C is a cross-sectional view of the nut plate of FIG. 7B.

Additional reference is made to FIG. 7B. The sidewall gap cover 720 is mounted to the bracket 730, which has a custom slot pattern consisting of first and second rectangular slots 732 and 734, and an opening (e.g., a hole or parallel slot) 736 in between. A nut plate 700 includes first and second posts 702 and 704 having rectangular cross-sections (FIG. 7C). The nut plate 700 may be attached to the bracket 730 by inserting the posts 702 and 704 into the rectangular slots 732 and 734 and moving the nut plate 700 in the direction of the arrow. A locking member 706 is then inserted in the space between the second post 734 and the trailing land. In this locked position, the nut plate's bore 708 is aligned with the opening 736 in the mounting bracket 730. After the nut plate 700 has been locked to the mounting bracket 730, a conventional threaded fastener 740 or ring post may be threaded onto the nut plate 700.

Figure 8A:
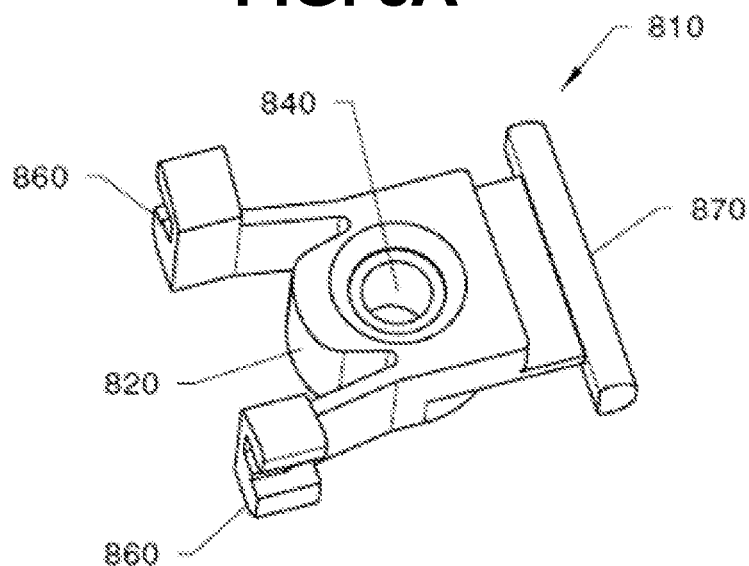
FIGS. 8A and 8B are illustrations of a second embodiment of a self-indexing nut plate.
Figure 8B:
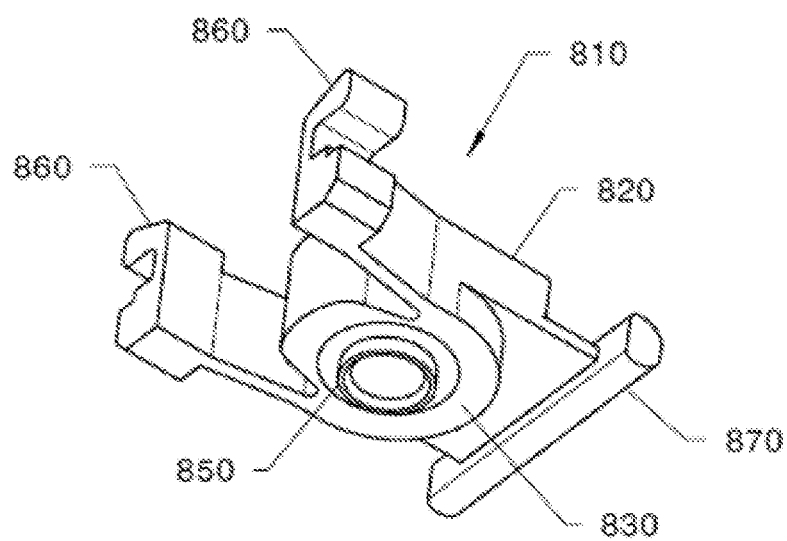

Reference is now made to FIGS. 8A and 8B, which illustrate a second embodiment of a self-indexing nut plate 810. The second embodiment of the nut plate 810 is configured to engage a spanner bar having return flanges. The nut plate 810 includes a body 820 having a flat mounting surface 830 and an internal bore 840 that extends to the mounting surface 830. The bore 840 may have an internally threaded portion for engaging fastener hardware.

The nut plate 810 further includes a boss (locator protrusion) 850 extending outward from the mounting surface 830. The boss 850 is coaxially aligned with the internal bore 840. As described below, the boss is configured to constrain motion of the nut plate along a surface of a spanner bar.

The nut plate 810 further includes first and second resilient finger tabs 860 and a cross bar 870 for constraining motion of the nut plate 810 away from the spanner bar. The first and second resilient finger tabs 860 are cantilevered to the body 820 and extend outward from one end of the body 820. The tabs 860 are configured to releasibly engage the return flanges of the spanner bar. The cross bar 870 is located at an opposite end of the body 820 and extends transversely across the body 820.

Additional reference is made to FIG. 9A, which illustrates a method of installing the nut plate 810 on a spanner bar 900 having return flanges 902. At step 950, the nut plate 810 is positioned sideways on a surface 904 of the spanner bar 900, with the cross bar 870 touching the surface 904 and oriented lengthwise along the spanner bar 900. At step 960, the nut plate 810 is rotated 90 degrees counter-clockwise until the cross bar 870 extends across the width of the spanner bar 900.

Figure 10:
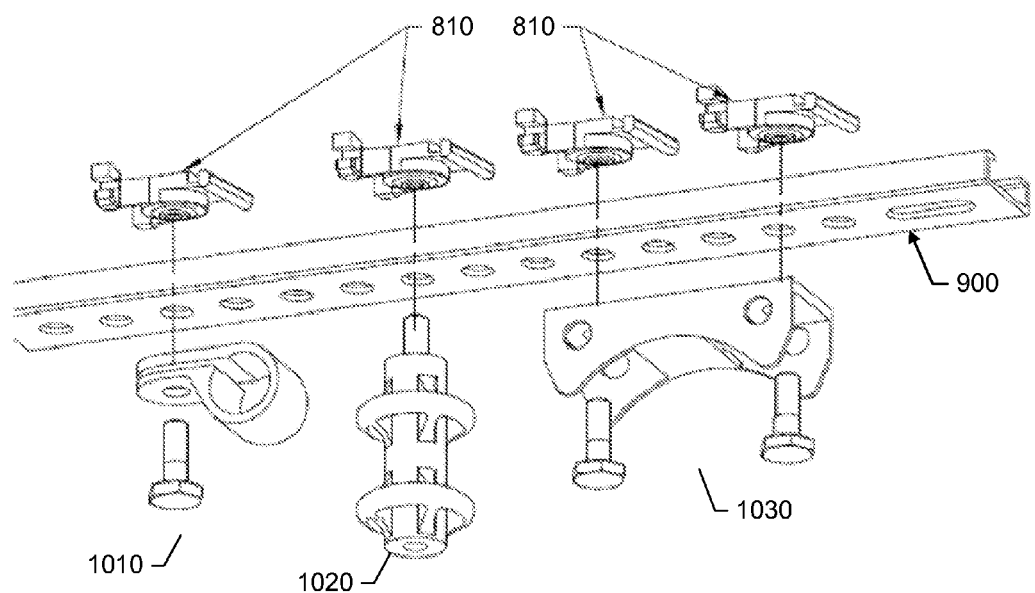
FIG. 10 is an illustration of various types of mounting hardware that may be fastened to the second embodiment of the self-indexing nut plate.

At step 970, the resilient finger tabs 860 are pressed inward as the nut plate 810 is rotated downward towards the spanner bar surface 904. The position of the nut plate 810 along the spanner bar 900 is adjusted until the boss 850 engages a spanner bar mounting hole (the mounting hole is best seen in FIG. 10). The boss 850 is configured to fit snuggly in the mounting hole. After step 970 has been completed, the mounting surface 830 of the nut plate body 820 is flush against the spanner bar surface 904.

At step 980, the resilient tabs are released, whereby the tabs 860 engage the return flanges 902. The boss 850 constrains the motion of the nut plate 810 along the spanner bar 900, and the tabs 860 and the cross bar 870 constrain the motion of the nut plate 810 away from the spanner bar 900. In this manner, the nut plate 810 is engaged with the spanner bar 900 prior to being engaged with fastener hardware.

FIG. 9B is another illustration of the nut plate 810 engaged with the spanner bar 900. FIG. 9C, which is an illustration of the nut plate 810 and spanner bar 900 taken along lines 9C-9C of FIG. 9B, shows the resilient finger tabs 860 engaging the return flanges 902 of the spanner bar 900. Vertical stop blocks and multi-step indentations 865 accommodate the tolerance range of the inner height of the return flanges 902.

FIG. 9D is an illustration of the nut plate 810 and spanner bar 900 taken along lines 9D-9D of FIG. 9B. The cross bar 870 is abutted against the return flanges 902 of the spanner bar 900.

FIG. 10 illustrates various types of mounting hardware that may be secured to the spanner bar 900 by fastening to the nut plates 810. The mounting hardware includes, but is not limited to, p-clamps 1010, ring posts 1020, and saddles 1030.

Figure 11A:
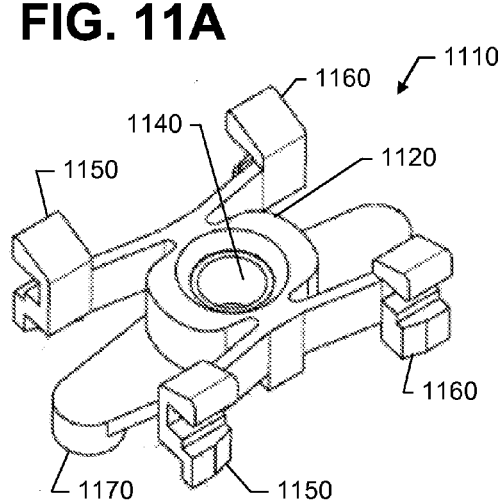
FIGS. 11A and 11B are illustrations of a third embodiment of a self-indexing nut plate.
Figure 11B:
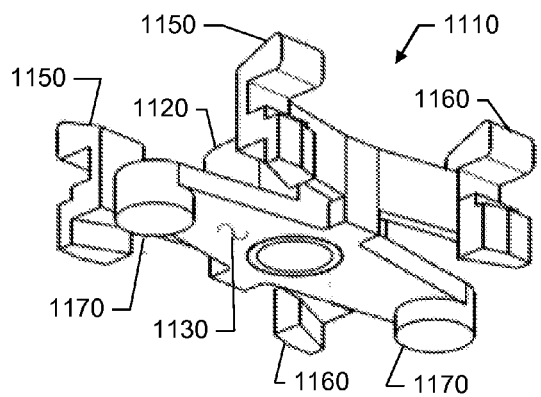

Reference is now made to FIGS. 11A and 11B, which illustrate a third embodiment of a self-indexing nut plate 1110. Similar to the second embodiment, the third embodiment of the self-indexing nut plate 1110 includes a body 1120 having a flat mounting surface 1130 and an internal bore 1140. The nut plate 1110 further includes first and second resilient finger tabs 1150 that are cantilevered to the body 1120 and extend outward from the body 1120 in a first direction. The first and second tabs 1150 are configured to releasibly engage the return flanges of a spanner bar.

Unlike the second embodiment, the third embodiment of the nut plate 1110 includes first and second locator pins 1170 instead of the boss. The locator pins 1170 are configured to engage two mounting holes of the spanner bar and thereby constrain the nut plate 1110 from moving along a surface of the spanner bar. When the locator pins 1170 engage the mounting holes, the internal bore 1140 is aligned with another mounting hole in the spanner bar (between the two engaged holes).

Unlike the second embodiment, the third embodiment of the nut plate 1110 includes third and fourth resilient tabs 1160 in place of the cross bar. These additional resilient tabs 1160 are cantilevered to the body 1120 and extend outward from the body 1120 in a second direction, which is opposite the first direction. The third and fourth tabs 1160 are also configured to releasibly engage the return flanges of a spanner bar.

Each tab 1150 and 1160 includes vertical stop blocks and a multi-step indentation. These accommodate the tolerance range of the inner height of the return flanges.

To install the third embodiment of the nut plate 1110, the first and second tabs 1150 are depressed inwards, and the third and fourth tabs 1160 are depressed inwards. The nut plate 1110 is positioned above an open slot of the spanner bar and then lowered into the slot. The locator pins 1170 are seated into mounting holes, and then the tabs 1150 and 1160 are released. The nut plate 1110 is now engaged with the spanner bar prior to being engaged with fastener hardware.

A nut plate herein is not limited to ring posts and other wire support hardware, nor is it limited to threaded fasteners. For example, a nut plate herein may be used with push-in fasteners.

Reference is made to FIGS. 12A and 12B, which illustrate an assembly 1210 including a bracket 1220, a self-indexing nut plate 1230, and a push-in fastener 1240. The bracket 1220 may have a slotted hole pattern for mounting the nut plate 1230. The push-in fastener 1240 may be used, for example, to fasten a p-clamp 1250 to the bracket 1220. The internal bore 1235 of the nut plate 1230 may be smooth and may have a non-threaded provision for engaging a push-in barb, as shown in FIG. 12B. In other embodiments, the internal bore may be threaded for a push-in fastener.

A nut plate herein offers several advantages over a conventional nut and washer. A nut plate herein may be installed without having to also install fastener hardware such as a ring post. The independent installation reduces production flow and allows modularization. As but one example, a plurality of nut plates herein are pre-installed on a spanner bar to form a raceway wire bundle module. Preassembling raceway wire bundles into modules reduces the touch time of the installers during the installation of the wire bundles in an aircraft. Installing a wire bundle module is more efficient than installing individual wires.

A nut plate herein is self indexing. When the nut plate engages a secondary support member, its bore is aligned with a hole in the support structure. Time and ease of installation is reduced.

Moreover, no tooling is required to install a nut plate. No manual dexterity is needed to slip a washer over a fastener, and then turn a nut onto the fastener. A visual sightline to the back side of the secondary support structure is not needed. A nut plate herein is simply pushed into a secondary support structure, snapped into position, and locked in place.

A nut plate herein has a lower part count than a conventional nut and washer. In addition to terminating a fastener, the nut plate eliminates the need for a washer.

The savings in time and cost afforded by a single nut plate herein might seem trivial. However, given the total number of fastening operations in a commercial aircraft, the savings in the aggregate can be quite substantial.

A nut plate herein is not limited to aircraft. Other applications include, but are not limited to, marine, automotive and electronic products.

The invention claimed is:

1. An aircraft having a primary support structure, the aircraft comprising:
    a secondary support structure; and
    a nut plate engaging the secondary support structure, the nut plate including:
        a body having a mounting surface against the secondary support structure and defining an internally threaded bore;
        at least one locator protrusion engaging a mounting hole in the secondary support structure to constrain motion of the nut plate along the secondary support structure in a first direction; and
        a locking member occupying a space between one of the first and second posts and a land, the locking member including a first end cantilevered to the body, a second, free end, and a release grip connected to the free end and extending outwardly from the locking member, the member being operable to constrain motion of the nut plate in a second direction, the second direction differing from the first direction,
    wherein the at least one locator protrusion includes first and second posts, the posts extending from the mounting surface and through respective holes in the secondary support structure and including an undercut portion in each of the first and second post, the undercut portions being operable to constrain motion of the nut plate in a third direction.

2. The aircraft of claim 1, wherein the secondary support structure includes a spanner bar; and wherein the nut plate is constrained without the use of mounting hardware.

3. The aircraft of claim 1, further comprising mounting hardware that is fastened onto the nut plate.

4. The aircraft of claim 3, further comprising a wire bundle carried by the mounting hardware.

5. The aircraft of claim 3, further comprising tubing carried by the mounting hardware.

6. The aircraft of claim 1, wherein the bore is offset from the posts by a distance such that the bore is aligned with another hole in the secondary support structure.

7. The aircraft of claim 1, wherein the portion of the posts abutting against the lands are solid and elliptical in cross section.

8. The aircraft of claim 1, wherein the locking member is resilient and retractable.

9. The aircraft of claim 1, wherein each post terminates in an enlarged cap, the cap and the mounting surface forming the undercut portion, which is narrower than the secondary support structure's gauge, wherein the cap snaps onto one of the lands as the nut plate is pushed into engagement with the secondary support structure.

* * * * *